Figure 1:
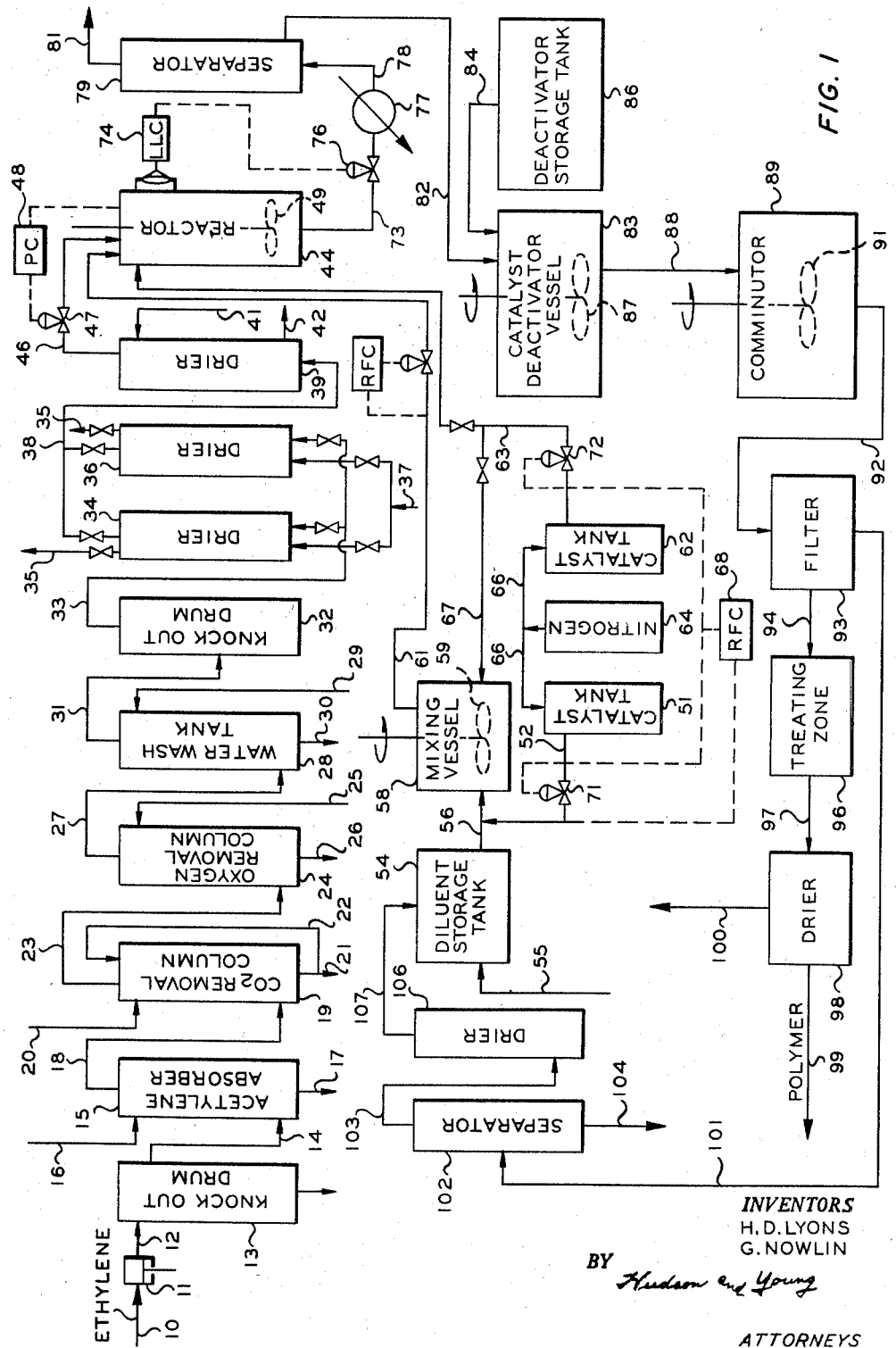

INVENTORS
H. D. LYONS
G. NOWLIN

ATTORNEYS

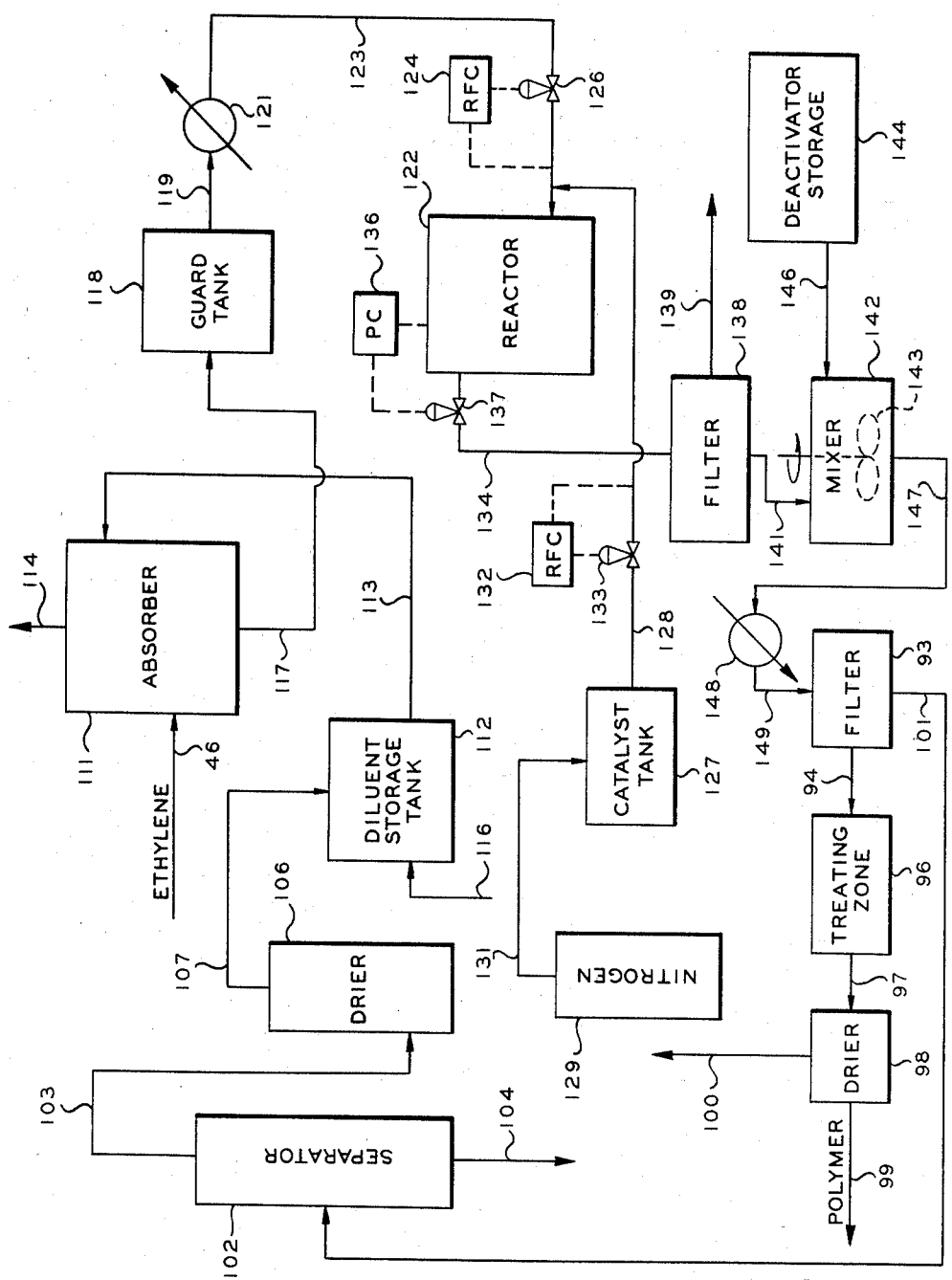

United States Patent Office 2,910,461
Patented Oct. 27, 1959

2,910,461

CONTINUOUS PROCESS FOR THE PRODUCTION OF HIGH MOLECULAR WEIGHT OLEFIN POLYMERS

Gene Nowlin, Glen Burnie, Md., and Harold D. Lyons, Bartlesville, Okla., assignors to Phillips Petroleum Company, a corporation of Delaware Application May 14, 1956, Serial No. 584,776

9 Claims. (Cl. 260—94.9)

This invention relates to a continuous process for producing high molecular weight olefin polymers. In one aspect, it relates to a continuous process for producing high yields of high purity olefin polymers.

It has recently been discovered that new and useful high molecular weight olefin polymers can be prepared by polymerizing olefins in the presence of various novel catalyst systems. Such catalyst systems may contain two or more components where one component is an organometallic compound, metal hydride or a group I, II or III metal, and the other component is a group IV to VI or VIII metal compound (Mendeleeff's periodic system). When employing such catalyst systems, certain problems arise which must be overcome before a polymer having a purity and color suitable for commercial utilization can be produced in high yields. For example, it has been found that certain materials, such as water, oxygen and carbon dioxide, have a tendency to inactivate the catalyst compositions. Therefore, it would be desirable to provide an effective means for removing such materials from the olefin to be polymerized prior to contact with the catalyst. Furthermore, the diluent utilized in the polymerization should also be freed of contaminants. It would also be desirable if means were provided for purifying the polymer so as to produce a white or nearly white solid polymer. In this regard, if the polymer is in finely divided form having a uniform particle size, better contact is possible between the polymer and the purifying or decolorizing agent, thereby resulting in a more effective decolorizing of the polymer.

It is an object of this invention, therefore, to provide a continuous process for producing high yields of olefin polymers which are of a purity and color suitable for commercial use.

Another object of the invention is to provide a continuous olefin polymerization process in which substantially all of the catalyst inactivating materials are removed from the olefins to be polymerized and from the diluent used in the process.

Still another object of the invention is to provide a continuous olefin polymerization process in which the polymer product is treated so as to produce a polymer of suitable color.

A further object of the invention is to provide a continuous polymerization process whereby high purity solid olefin polymers are produced in high yields.

Other and further objects and advantages of the invention will become apparent to one skilled in the art upon referring to the accompanying disclosure.

In one preferred embodiment, the continuous polymerization process of this invention comprises the following steps: (1) purifying an olefin feed stream by removing impurities such as acetylene, oxygen, carbon dioxide and moisture therefrom, (2) introducing the purified olefin into a polymerization reaction zone, (3) controlling the rate of olefin introduction so as to maintain a predetermined pressure in said zone, (4) mixing a first component of an olefin polymerization catalyst system with a hydrocarbon diluent, inert and liquid under conditions of the process, (5) passing the resulting mixture of diluent and catalyst component into the reaction zone, (6) introducing a second component of the catalyst system into the reaction zone, (7) controlling the rate at which the first and second components of the catalyst system are supplied to the reaction zone, (8) withdrawing reaction products comprising a slurry of polymer in diluent from the reaction zone, (9) cooling the withdrawn reaction products so as to precipitate any polymer dissolved in the diluent, (10) contacting the slurry of polymer in diluent with a suitable catalyst deactivator, (11) passing the resulting treated slurry of polymer in diluent into a comminution zone; (12) comminuting the solid polymer in said comminution zone in the presence of the catalyst deactivator, (13) separating finely divided polymer from the diluent and the catalyst deactivator, (14) treating the finely divided polymer to remove catalyst residues, and (15) drying the finely divided polymer.

In another preferred embodiment of the invention, one of the catalyst components is used to form a fixed bed within the reaction zone, and the olefin to be polymerized and the other catalyst component or components are passed simultaneously over this bed. The procedure followed in purifying the olefins and in treating the products of the polymerization is essentially the same as that described hereinabove.

The process of this invention is applicable to the polymerization of olefins utilizing a large number of different catalyst systems. In practicing the process, it is preferred to use a catalyst comprising (A) an organometallic compound, a metal hydride, or a group I, II or III metal, and (B) a group IV to VI or VIII metal compound. More specifically, the catalyst which can be used is one selected from the following group of catalysts:

(I) A catalyst comprising (A) a member selected from the group consisting of (a) a compound corresponding to the formula $MR_n$, (b) a compound corresponding to the formula $R_xM'X_y$, (c) a mixture of an organic halide and a free metal M and (d) a free metal M, and (B) a member selected from the group consisting of (1) a group IV-A metal halide selected from the group consisting of titanium, zirconium, hafnium, and thallium, (2) a complex salt of said group IV metal halide and a halide selected from the group consisting of ammonium and alkali metal halides, (3) a molybdenum derivative selected from the group consisting of molybdenum oxides and ammonium and alkali metal molybdates, (4) a derivative selected from the group consisting of oxides and halides of iridium, platinum and osmium, and complex salts of said halides and a halide selected from the group consisting of ammonium and alkali metal halides, (5) a vanadian derivative selected from the group consisting of oxides, halides, and oxyhalides of vanadium and complex salts of said halides and a halide selected from the group consisting of ammonium and alkali metal halides, and (6) a derivative selected from the group consisting of halides, oxyhalides, hydroxyhalides, and oxyhydroxyhalides of molybdenum, tungsten, uranium, selenium, tellurium, and palladium, and complex salts of said halides and oxyhalides and a halide selected from the group consisting of ammonium and alkali metal halides, wherein M is a metal selected from the group consisting of sodium, potassium, lithium, rubidium, cesium, beryllium, magnesium, zinc, cadmium, mercury, aluminum, gallium, indium and thallium, wherein R is a member selected from the group consisting of hydrogen, an alkyl radical, a cycloalkyl radical, an aryl radical, and combinations of these radicals, e.g., alkaryl or aralkyl radicals, wherein M' is selected from the group consisting of aluminum, gallium, indium, thallium and beryllium, wherein X is a halogen, wherein $n$ is equal to the valence of metal M, and wherein $x$ and $y$ are integers, the sum of $x$ and $y$ being equal to the valence of metal M';

(II) A catalyst comprising (A) a member selected from the group consisting of (a) a compound corresponding to the formula $MR_n$, (b) a compound corresponding to the formula $R_xM'X_y$, and (c) a mixture of an organic halide and a free metal M, and (B) a member selected from the group consisting of (1) a derivative selected from the group consisting of oxides, oxyhalides and hydrides of a group IV metal, including titanium, zirconium, cerium, hafnium, thorium, germanium, tin, and lead, and (2) a chromyl halide, wherein R, M, M', X, $n$, $x$ and $y$ are as indicated hereinabove under (I);

(III) A catalyst comprising (A) a member selected from the group consisting of (a) a mixture of an organic halide and free metal M, (b) a mixture of aluminum chloride and a free metal M, and (c) a compound corresponding to the $R_xM'X_y$, and (B) a member selected from the group consisting of (1) compounds corresponding to the formula $X_aM''(OR')_b$, (2) compounds corresponding to the formula $M''_c[(OCH_2CH_2)_cNH_{(3-c)}]_d$, (3) salts of monobasic organic acids and a group IV–A metal, and (4) complex salts of dibasic organic acids and at least one group IV–A metal and at least one selected from the group consisting of alkali metals and ammonia, wherein R, M, M', X, $x$ and $y$ are as indicated hereinabove under I, wherein M'' is a group IV–A metal, including zirconium, hafnium, and thorium, wherein R' is selected from the group consisting of R''' and R'''' where R''' is selected from the group consisting of alkyl, alkenyl, cycloalkyl, cycloalkenyl and aryl radicals and combinations of these radicals, and R'''' is selected from the group consisting of (a') R''' radicals which are halogen substituted, (b') R''' radicals which contain oxygen, and (c') R''' radicals which are halogen substituted and contain oxygen, said oxygen being present in the form of an ether linkage, wherein $a$ and $b$ are whole numbers with $b$ being at least one and not greater than the valence of M'' and with the sum of $a$ and $b$ being equal to the valence of M'', and wherein $c$ is an integer from 1 to 3, inclusive, and $d$ is equal to the valence of M'';

(IV) A catalyst comprising (A) a compound corresponding to the formula $MR_4$ and (B) a member selected from the group consisting of a group IV–A metal halide and complex salts of said halide and a halide selected from the group consisting of ammonium and alkali metal halides, wherein M is a group IV metal and R is selected from the group consisting of alkyl, alkenyl, cycloalkyl, cycloalkenyl, aryl radicals and combinations thereof;

(V) A catalyst comprising (A) a halide of a metal selected from the group consisting of titanium, zirconium, and hafnium, and (B) a hydride of a metal selected from the group consisting of lithium, sodium, potassium, rubidium, cesium, magnesium, calcium, strontium, barium, lanthanum and thorium;

(VI) A catalyst comprising (A) a compound corresponding to the formula $MR_x$ and (B) a member selected from the group consisting of halides of titanium, zirconium, vanadium and molybdenum, oxyhalides of titanium, zirconium, vanadium, molybdenum and chromium, and complex salts of said halides and said oxyhalides with a member selected from the group consisting of ammonium and alkali metal halides, wherein M is a metal selected from the group consisting of zinc, cadmium, mercury and magnesium, wherein R is selected from the group consisting of alkyl, alkenyl, cycloalkyl, cycloalkenyl, and aryl radicals and combinations of these radicals and wherein $x$ is equal to the valence of the metal M;

(VII) A catalyst comprising (A) a group IV–A metal derivative selected from the group consisting of (1) salts of monobasic organic acids and a group IV–A metal, (2) complex salts of dibasic organic acids and at least one group IV–A metal and at least one member selected from the group consisting of alkali metals and ammonia, (3) compounds corresponding to the formula $X_aM''(OR')_b$, (4) compounds corresponding to the formula $$M''_c[(OCH_2CH_2)_cNH_{(3-c)}]_d$$

(5) acetylacetonates of a group IV–A metal, wherein X, M'', R', $a$, $b$, $c$, and $d$ are as described hereinabove under (II), and (B) a compound of a metal selected from groups II to VIII, inclusive, having the valence linkages thereof individually bound to members selected from the group consisting of hydrogen, alkyl, cycloalkyl and aryl radicals, and alkali metal alkyl and alkali metal aryl complexes of said compound of a metal, and (C) a member selected from the group consisting of halogens and hydrogen halides;

(VIII) A catalyst comprising (A) a member selected from the group consisting of (a) a compound corresponding to the formula $R_xM'X_y$, (b) a mixture of an organic halide and a metal M and (c) a complex hydride of a metal selected from the group consisting of aluminum, gallium, indium and thallium and an alkali metal hydride, wherein R, M, M', X, $n$, $x$ and $y$ are as described hereinabove under (I), (B) a metal halide selected from the group consisting of tri- and tetrahalides of titanium, zirconium, hafnium and germanium and (C) a member selected from the group consisting of (1) an organophosphorus containing compound corresponding to the formula $R'_3P$, wherein R' is selected from the group consisting of alkyl, cycloalkyl and aryl radicals and combinations of these radicals, (2) a peroxide corresponding to the formula $R''OOR''$, wherein R'' is selected from the group consisting of hydrogen, alkyl, aralkyl, alkaryl, cycloalkyl, acyl, alkyne and aryl radicals, (3) a compound corresponding to the formula $M''(OR''')_n$, wherein M'' is a metal selected from the group consisting of lithium, sodium, potassium, rubidium, cesium, magnesium, calcium, zinc, strontium, cadmium, barium, aluminum, gallium, indium and thallium, R''' is selected from the group consisting of alkyl, alkenyl, cycloalkyl, cycloalkenyl and aryl radicals and combinations of these radicals, and $m$ is equal to the valence of metal M'', and (4) a compound selected from the group consisting of carbides corresponding to the formula $M'''_aC_2$ and acetylenic compounds corresponding to the formula $M'''—(C≡CR')_b$, wherein M''' is a metal selected from the group consisting of lithium, sodium, potassium, rubidium, cesium, magnesium, barium, strontium, calcium, zinc, cadmium, mercury, copper, silver and gold, R' is selected from the group consisting of hydrogen, alkyl, cycloalkyl and aryl radicals and combinations of these radicals, wherein $a$ equals 2 when the valence of metal M''' is 1 and wherein $a$ equals 1 when the valence of metal M''' is 2, and wherein $b$ is equal to the valence of metal M''';

(IX) A catalyst comprising (A) a metal halide selected from the group consisting of halides of titanium, zirconium, hafnium, and germanium, (B) a hydride selected from the group consisting of hydrides of aluminum, gallium, indium and thallium and complexes of said hydrides with alkali metal hydrides, and (C) an organic halide corresponding to the formula RX wherein R is selected from the group consisting of alkyl, cycloalkyl, alkenyl, cycloalkenyl, aryl, and alkynyl radicals and combinations of these radicals and wherein X is a halogen; and (X) A catalyst comprising (A) at least one titanium derivative selected from the group consisting of (1) compounds corresponding to the formula $X_nTi(OR)_m$, (2) compounds corresponding to the formula $$Ti_a[(OCH_2CH_2)_aNH_{(3-a)}]_b$$

(3) salts of monobasic organic acids and titanium, and (4) complex salts of dibasic organic acids and titanium and at least one member selected from the group consisting of alkali metals and ammonia, wherein X is a halogen, wherein R is selected from the group consisting of R″ and R‴, where R″ is selected from the group consisting of alkyl, alkenyl, cycloalkyl, cycloalkenyl, and aryl radicals and combinations of these radicals, where R‴ is selected from the group consisting of (a) R″ radicals which are halogen substituted, (b) R″ radicals which contain oxygen, and (c) R″ radicals which are halogen substituted and contain oxygen, said oxygen being present in the form of an ether linkage, wherein R contains from 1 to 20 carbon atoms and the compound contains up to a total of 50 carbon atoms, wherein $m$ and $n$ are whole numbers, with $m$ being at least 1 and not greater than the valence of the titanium and with the sum of $m$ and $n$ being equal to the valence of the titanium, and wherein $a$ is an integer from 1 to 3 inclusive, and $b$ is equal to the valence of the titanium; (B) at least one complex hydride corresponding to the formula $MM'H_x$, wherein M is an alkali metal, M′ is a metal selected from the group consisting of aluminum, gallium, indium and thallium, and X is equal to the sum of the valences of M and M′; and (C) at least one halide of aluminum.

Examples of, but not exhaustive of, catalyst compositions falling within the scope of the above disclosure are as follows:

(I) Triethylaluminum and titanium tetrachloride; triethylaluminum and titanium tetrabromide; triethylaluminum and zirconium tetrachloride; triisobutylaluminum and titanium tetrachloride; ethyl bromide, magnesium, and titanium tetrachloride; ethyl bromide, sodium, and titanium tetrachloride; diethylaluminum chloride and titanium tetrachloride; ethylaluminum dichloride and titanium tetrachloride; diethylaluminum chloride and zirconium tetrachloride; titanium tetrachloride, diethylaluminum chloride, and ethylaluminum dichloride; magnesium and zirconium tetrachloride; sodium and titanium tetrachloride; aluminum and titanium tetrachloride; potassium fluotitanate and diethylaluminum chloride; potassium fluotitanate and triethylaluminum; potassium fluotitanate and lithium aluminum hydride; potassium fluozirconate, diethylaluminum chloride and ethylaluminum dichloride; molybdenum sesquioxide and diethylaluminumchloride, molybdenum sesquioxide and triethylaluminum; sodium molybdate, ethyl bromide and magnesium; sodium molybdate and triethylaluminum; iridium tetrachloride and diethylaluminum chloride; iridium tetrachloride and triethylaluminum; platinum tetrachloride, ethyl bromide, and magnesium; potassium chloroiridate, diethylaluminum chloride, and ethylaluminum dichloride; vanadium pentachloride, diethylaluminum chloride, and ethylaluminum dichloride; vanadium tetrachloride and triethylaluminum; vanadium tetrafluoride, ethyl bromide, and sodium; molybdenum pentachloride, diethylaluminum chloride, and ethylaluminum dichloride; molybdenum pentachloride and triethylaluminum; molybdenum dihydroxydichloride and diethylaluminum chloride; potassium molybdenum hexachloride, diethylaluminum chloride, and ethylaluminum dichloride;

(II) Titanium hydride, diethylaluminum chloride, and ethylaluminum dichloride; titanium hydride and triethylaluminum; zirconium hydride and lithium aluminum hydride; titanium dioxide, diethylaluminum chloride, and ethylaluminum dichloride; titanium dioxide and triethylaluminum; zirconium dioxide and lithium aluminum hydride; chromyl chloride, diethylaluminum chloride, and ethylaluminum dichloride; chromyl chloride and triethylaluminum; chromyl chloride and lithium aluminum hydride; chromyl bromide and triethylaluminum;

(III) Titanium butoxide, diethylaluminum chloride, and ethylaluminum dichloride; titanium potassium oxalate, aluminum chloride, and aluminum; titanium butoxide, aluminum chloride, and aluminum; triethanolamine titanate and diethylaluminum chloride;

(IV) Tetraphenyltin and titanium tetrachloride; tetraethyllead and titanium tetrachloride; tetraethyllead and zirconium tetrachloride;

(V) Calcium hydride and titanium tetrachloride; sodium hydride and titanium tetrachloride; lithium hydride and zirconium tetrachloride;

(VI) Diethylmagnesium and titanium tetrachloride; diethylzinc and vanadium tetrachloride; diethylzinc and chromyl chloride; di-n-butylzinc and titanium tetrachloride;

(VII) Triethylaluminum, titanium butoxide, and bromine; triethylaluminum titanium acetylacetonate, and chlorine; triethylgallium, titanium butoxide, and hydrogen chloride; diethylberyllium, titanium potassium oxalate, and hydrogen bromide;

(VIII) Titanium tetrachloride, triphenylphosphene, and diethylaluminum chloride; titanium trichloride, tributylphosphene, and lithium aluminum hydride; zirconium tetrachloride, triphenylphosphene, and a mixture of ethylaluminum dichloride and diethylaluminum chloride; titanium tetrachloride, benzoyl peroxide, and a mixture of ethylaluminum dichloride and diethylaluminum chloride; titanium tetrachloride, benzoyl peroxide, and lithium aluminum hydride; titanium tetrachloride, di-tert-butylperoxide, and diethylaluminum chloride; titanium tetrachloride, aluminum ethoxide, and a mixture of ethylaluminum dichloride and diethylaluminum chloride; titanium chloride, aluminum ethoxide, and ethylaluminum dichloride; zirconium tetrachloride, sodium peroxide, and lithium aluminum hydride; zirconium tetrachloride, calcium phenoxide, and diethylaluminum chloride; titanium tetrachloride, cuprous carbide, and a mixture of ethylaluminum dichloride and diethylaluminum chloride; zirconium tetrachloride, calcium carbide, and lithium aluminum hydride;

(IX) Titanium tetrachloride, lithium aluminum hydride, and allyl bromide; zirconium tetrachloride, lithium aluminum hydride, and ethyl bromide; titanium trichloride, lithium aluminum hydride, and ethyl bromide;

(X) Titanium butoxide, lithium aluminum hydride, and aluminum chloride; titanium potassium oxalate, lithium aluminum hydride, and aluminum chloride; triethanolamine titanate, lithium aluminum hydride, and aluminum chloride; titanium butoxide, lithium gallium hydride, and aluminum chloride; and the like.

A better understanding of the invention may be obtained by referring to the following disclosure and the drawing, in which:

Figure 1 is a flow diagram illustrating one preferred embodiment of our invention; and Figure 2 is a flow diagram illustrating another preferred embodiment of our invention.

The continuous process of this invention will be described specifically with relation to the polymerization of ethylene. It is to be understood, however, that the invention is not limited to ethylene but is applicable in general to polymerizable hydrocarbons. Preferably, the polymerizable hydrocarbons are olefins containing a $CH_2=C<$ radical. The preferred class of polymerizable hydrocarbons used is aliphatic 1-olefins having up to and including 8 carbon atoms per molecule. Specifically, the normal 1-olefin, ethylene, has been found to polymerize to a polymer thereof upon being contacted with the catalyst compositions referred to hereinabove at lower temperatures and pressures than have been used in the prior art processes. Examples of other polymerizable hydrocarbons which can be used in the process of this invention are propylene, 1-butene, 1-hexene and 1-octene. Branched chain olefins can also be used, such as isobutylene. Also, 1,1 - dialkyl-substituted and 1,2 - dialkyl-substituted ethylenes can also be used, such as butene-2, pentene-2, hexene-2, heptene-3, 2-methylbutene-1, 2- methylhexene-1, 2-ethylheptene-1, and the like. Examples of the di- and polyolefins in which the double bonds are in nonconjugated positions and which can be used in accordance with this invention are 1,5-hexadiene, 1,4-pentadiene and 1,4,7-octatriene. Cyclic olefins can also be used, such as cyclohexene. Mixtures of the foregoing polymerizable hydrocarbons can be polymerized to a solid polymer in the presence of our novel catalyst as, for example, by copolymerizing ethylene and propylene, ethylene and 1-butene, propylene and 1-butene, or propylene and a pentene. Aryl olefins, e.g., styrene and alkyl-substituted styrenes can also be polymerized to a solid polymer by the process of this invention. This invention is also applicable to the polymerization of a monomeric material comprising conjugated dienes containing from 4 to 8, inclusive, carbon atoms. Examples of conjugated dienes which can be used include 1,3-butadiene, 2-methyl-1,3-butadiene, 2,3-dimethyl-1,3-butadiene, 2-methyl-1,3-pentadiene, chloroprene, 1-cyanobutadiene, 2,3-dimethyl-1,3-pentadiene, 2-methyl-3-ethyl-1,3-pentadiene, 2-methoxybutadiene, 2-phenylbutadiene and the like. It is within the scope of the invention to polymerize such conjugated dienes either alone or in admixture with each other and/or with one or more other compounds containing an active $CH_2=C<$ group which are copolymerizable therewith. Included among these latter compounds are monoolefins such as those described hereinabove. Other examples of compounds containing an active $CH_2=C<$ group which are copolymerizable with one or more conjugated dienes are styrene, acrylonitrile, methacrylonitrile, methacrylate, methyl methacrylate, vinyl acetate, vinyl chloride, 2-methyl-5-vinylpyridine, 2-vinylpyridine, 4-vinylpyridine, etc.

Referring now to Figure 1 of the drawing, an ethylene feed stream from a suitable ethylene source, e.g., from hydrocarbon cracking or from the dehydrogenation of ethyl alcohol, is passed through line 10 into compressor 11. In the compressor the ethylene is compressed to a desired pressure, e.g., to a pressure between 100 and 1000 p.s.i.g., and then passed through line 12 into knock-out drum 13 for removal of any liquids which may have been formed during the compression step. The compressed gas is then fed by line 14 into acetylene absorber 15 wherein the gas is contacted with a suitable acetylene absorbent, such as dimethylformamide, to remove any acetylene contained in the feed stream. The absorbent material is introduced into the absorber through line 16 and removed therefrom through line 17. The acetylene-free gas is recovered from the absorber through line 18 and passed into carbon dioxide removal column 19 wherein the ethylene stream is contacted with a dilute solution of aqueous caustic, such as sodium hydroxide. The aqueous sodium hydroxide, which is charged to scrubber 19 through line 20, is removed therefrom by means of drain line 21. In order to effect maximum contact between the ethylene and the sodium hydroxide, the sodium hydroxide may be recycled from the bottom to the top of the scrubber by means of recycle lines 22. It is also with the purview of this invention to effect the removal of carbon dioxide by utilizing other suitable carbon dioxide adsorbents, such as monoethanolamine.

The carbon dioxide-free ethylene feed stream is passed from scrubber 19 via line 23 into oxygen removal column or scrubber 24. In scrubber 24 the ethylene stream is contacted with an alkaline pyrogallol solution in order to remove any oxygen which may be present. The pyrogallol solution which is supplied to scrubber 24 through line 25 is removed therefrom by line 26 for recycle to a caustic makeup tank, not shown. While the pressure in scrubber 24 is not critical, it is preferred to operate at least at atmospheric pressure. Where desired, pressures as high as 1000 p.s.i. or higher may be utilized. It is preferred that the contacting be effected at temperatures of at least 50° F. in order to avoid undesirably low reaction rates. Temperatures above 75° F. are preferred, but temperatures as high as 175° F. or higher can be used. The alkaline solution of pyrogallol may contain as little as 0.1 percent pyrogallol and still be effective, but it is preferred to have the solution contain at least 1 percent pyrogallol. The solution should contain excess alkali over that reacting with the pyrogallol, the concentration of alkali in the solution preferably being at least 5 percent by weight. Solutions containing considerably smaller amounts of alkali are effective as are those solutions containing considerably more alkali, for example, 20 weight percent. While it is preferred to utilize an alkaline pyrogallol solution to remove the oxygen from the ethylene, it is within the contemplation of the invention to employ other means for effecting such removal. For example, a bed of hot copper or a bed of hot reduced iron oxide can be used in the oxygen scrubber instead of the alkaline pyrogallol solution.

The ethylene feed stream from which acetylene, carbon dioxide, and oxygen have been removed is then passed from the oxygen scrubber via line 27 to water wash tank 28. In the water wash tank, the ethylene stream is scrubbed with water to remove any traces of pyrogallol and caustic which may have been carried over in the gaseous stream. Water is supplied to tank 28 through line 29 and is withdrawn therefrom through line 30. The scrubbed ethylene which is withdrawn from tank 28 through line 31 is then passed into knock-out drum 32 where any entrained water is removed. The substantially pure ethylene stream is next passed via line 33 through one or other of the driers 34 and 36 for removal of most of the moisture remaining in the stream. The driers, which are packed with a suitable desiccant, such as silica gel or alumina, are manifolded in such a manner that one drier can be used for drying purposes while the other drier is being regenerated. Steam for regenerating one or other of the driers is supplied thereto by means of line 37, equipped with appropriate valves, and withdrawn therefrom through lines 35. By means of this arrangement of apparatus, the regeneration of the desiccant can be carried out without causing any delay in the continuous process.

The ethylene stream is removed from the driers through line 38 and passed into an additional drier 39 in order to remove any moisture which may still be present. In this drier, the ethylene is contacted with a hydrocarbon solution of a suitable organometal compound, such as triethylaluminum. The solution is supplied to drier 39 through line 41 and is removed therefrom by means of line 42. The removal of the water in the ethylene is brought about in drier 39 by a chemical reaction which forms aluminum hydroxide and ethane when triethylaluminum is utilized. In some cases, it may be found to be unnecessary to use drier 39 in which case it may be by-passed. For example, in some instances a small amount of water can be tolerated in the polymerization reaction, and driers 34 and 36 will be effective in removing a sufficient amount of the moisture from the ethylene.

The purified ethylene removed from drier 39 (or from driers 34 or 36, if drier 39 is by-passed) is then passed into polymerization reaction vessel 44 by means of line 46. The rate at which ethylene is charged to the reactor is controlled by a flow control means, such as motor valve 47, which is operatively connected to pressure controller 48. The pressure controller, which is also operatively connected to the reaction vessel, is given a setting corresponding to the pressure which it is desired to maintain in the reactor. While the pressure within the reactor can vary within rather wide limits as indicated hereinafter, it is preferred to operate at a pressure in the range of 100 to 300 p.s.i.g. The reactor is provided with a suitable stirring means 49 and is also equipped with suitable cooling and heating means, not shown, so that heat can be supplied to or removed from the reactor as required. The reaction temperature can be closely controlled by utilizing a suitable commercial temperature controller which operates the heat exchange means provided so as to maintain a desired reaction temperature.

One of the components of the catalyst system being utilized in the process, such as triethylaluminum, or some other component of the various catalyst systems described hereinabove, is withdrawn from tank 51 through line 52 and mixed with a suitable diluent from storage tank 54. Line 55 connected to tank 54 provides means for supplying make-up diluent to the system. The diluent, such as cyclohexane, is removed from tank 54 through line 56 and is combined with the triethylaluminum at the juncture of lines 52 and 56. The triethylaluminum and diluent are then passed by means of line 56 into mixing vessel 58, equipped with a suitable stirrer 59, wherein complete mixing of the diluent and catalyst component takes place. Suitable diluents, which can be used, include paraffins, cycloparaffins and/or aromatic hydrocarbons which are inert, non-deleterious and liquid under conditions of the process. The lower molecular weight alkanes such as propane, butane and pentane are especially useful when the process is carried out at low temperatures. However, the higher molecular weight paraffins and cycloparaffins, such as isooctane and methylcyclohexane, and aromatic diluents, such as benzene, toluene and the like, can also be used, particularly when operating at higher temperatures. Halogenated hydrocarbons, such as halogenated aromatics, halogenated paraffins, halogenated cycloparaffins and the like, are also useful as diluents. Mixtures of any two or more of the aforementioned diluents can also be employed in the process of this invention.

The triethylaluminum-cyclohexane mixture is withdrawn from mixing vessel 58 through line 61 for charging to reactor 44. The second component of the catalyst system, e.g., titanium tetrachloride, is withdrawn from storage tank 62 through line 63 for introduction into reactor 44. Purified nitrogen from tank 64 is fed to tanks 51 and 62 through line 66 so as to maintain a nitrogen atmosphere over the catalyst components stored in these tanks and in order to pressure the catalyst components and diluent into the reactor. Since the two catalyst components react with one another to form a colloidal complex catalyst, it is sometimes desirable to mix the two streams at their point of entry into reactor 44. To this end, a mixing T may be provided to which lines 61 and 63 are connected within the upper portion of the reactor. With certain catalyst systems, it is also often desirable to effect the mixing of the catalyst components in mixing vessel 59. When operating in this manner, the catalyst component removed from tank 62 through line 63 is passed into the mixing vessel through line 67. The rate of introduction of the components of the catalyst system into reactor 44 is controlled by a ratio flow controller 68 which is operatively connected to an orifice in line 52 and to flow control means, such as motor valves 71 and 72, in lines 52 and 63, respectively.

Stirring means 49 with which reactor 44 is furnished provides means for maintaining intimate contact between the ethylene and the catalyst at the gas-liquid phase interface and also within the liquid phase. The reactor effluent is withdrawn from the reactor through line 73 at such a rate as to maintain a predetermined liquid level within the reactor. This is accomplished by means of liquid level controller 74 which is operatively connected to the reactor and to a flow control means, such as motor valve 76, in line 73. The polymerization carried out in reactor 44 may be accomplished at any pressure from atmospheric and below to 30,000 p.s.i.g. and above. It is preferred, however, to operate at a pressure in the range of 50 to 1500 p.s.i.g., and even more desirably at a pressure between 100 and 300 p.s.i.g. The reaction temperature can also vary within rather wide limits, e.g., from —250° F. and below to 500° F. and above, but it is preferred to operate at a temperature in the range of 50° F. to 300° F. The catalyst concentration within reactor 44 can vary within the range of from 0.01 to 1.0 weight percent although higher concentrations may be employed if desired. The reaction time, i.e., the residence time within the reactor, can vary within the range of from one second to one hour when operating within the preferred ranges of temperature and pressure. However, under certain conditions of operation, residence times above one hour may be employed.

The ratio of the amounts of the components of the various catalyst suitable for use in the practice of this invention can vary over a wide range. The ratio of the amounts of organometallic compound, metal hydride or group I, II or III metal will usually be in the range of 0.02 to 50 mols, preferably 0.2 to 3 mols, of these materials per mol of groups IV to VI or VIII metal compound. When the catalyst system used includes a third component, the ratio of the amount of this material will generally be in the range of 0.02 to 50 mols preferably 0.2 to 3 mols, of the material per mol of groups IV to VI or VIII metal compound.

The reactor effluent consists essentially of a slurry of high molecular weight ethylene polymer in a cyclohexane-spent catalyst mixture. However, a small amount of the polymer may be dissolved in the diluent. After passage through cooler 77 in order to precipitate the dissolved polymer, the effluent is introduced into liquid-gas separator 79 by means of line 78. The gaseous effluent from separator 79, which is predominantly ethylene but contains small amounts of ethane and other normally gaseous hydrocarbons, is taken overhead from the separator through line 81 and passed to an ethylene purification system, not shown. The ethylene recovered from this system can then be recycled to line 10. The purification of the ethylene can be carried out by any suitable means, such as by liquefaction and low temperature fractionation. This method of purification is probably the most economical way to separate ethylene and ethane, the impurity present in the largest amount, although other means of separation, such as adsorption and fractionation at higher temperatures, can be employed.

The effluent from separator 79 is passed via line 82 into catalyst deactivator vessel 83. In this vessel the cyclohexane-spent catalyst-polymer slurry is contacted with a suitable catalyst deactivator which is introduced into the vessel via line 84 connected to deactivator storage tank 86. As a deactivating agent it is preferred to use an alcohol, such as methyl alcohol, ethyl alcohol, isopropyl alcohol and the like, but other deactivators such as water, a mixture of water and alcohol or air can also be utilized. Still other suitable deactivating agents are disclosed in our copending U.S. application Serial No. 499,650, filed April 6, 1955. The catalyst deactivator vessel is provided with a suitable stirring means 87 in order to ensure intimate contact between the deactivating agent and the ethylene polymer. The effluent from vessel 83 is passed through line 88 into comminutor 89 to ensure complete deactivation of the catalyst and removal of most of the catalyst residues from the polymer. The comminutor is equipped with a stirrer 91 or other suitable means for effecting intimate contact between the polymer and the deactivating agent and to produce a finely divided solid polymer having substantially uniform particle size. The polymer passed into the comminutor is swollen with the diluent cyclohexane and by carrying out the comminution of the polymer in the presence of the deactivating agent, it is possible to obtain a finely divided solid polymer. Any suitable commercially available grinding equipment such as colloid mills, ball mills, Waring Blendor or micropulverizer, can be used in effecting the desired comminution of the polymer.

The polymer suspension, which is withdrawn from comminutor 89 through line 92, is then passed into filter 93. After separation of solid polymer from the cyclohexane and deactivating agent in filter 96, the polymer is recovered from the filter and moved by a suitable conveying means, such as belt conveyor 94, into treating zone 96. In treating zone 96, the finely divided polymer is contacted with an acid, base or other suitable material to remove any catalyst residues which may still remain after the above discussed catalyst inactivating treatment. After washing to remove the treating agent, the polymer is passed by conveying means 97 into drier 98 wherein the polymer is heated to remove cyclohexane and treating agents. The polymer recovered from drier 98 by means of conveying means 99 is a high molecular weight polymer of suitable color and possessing other desirable physical properties. This polymer can then be sent to suitable storage facilities or can be passed directly to polymer fabrication facilities. Cyclohexane and treating agents, which are recovered from the drier through line 100, may after being condensed be recycled to the effluent stream removed from filter 93.

The liquid effluent from filter 93 is withdrawn through line 101 and then passed into separator 102. In this separator, the diluent, such as cyclohexane, is separated from the deactivating agent, the type of separation utilized being in general dependent upon the type of deactivating agent used. For example, when water is used as the deactivating agent, a simple phase separation is possible. However, with certain of the deactivating agents, such as methyl alcohol, the diluent forms azeotropes thereby making it necessary to employ an azeotropic distillation process to effect the desired separation. It is to be understood that any suitable method for making the desired separation comes within the scope of the invention. Cyclohexane is recovered from the separator through line 103 while the deactivating agent is removed therefrom through line 104. The deactivating agent may then be sent to waste disposal, or in some cases it may be advantageous to treat this material to remove impurities and reuse it in the process. After withdrawal from separator 102, the cyclohexane is introduced into drier 106 wherein it is contacted with bauxite or an alkali metal, such as sodium, in order to remove any moisture. From the drier the cyclohexane is passed by means of line 107 into diluent storage tank 54. In some systems it may be found that impurities are dissolved in the diluent, making necessary further purification of the diluent before introduction into the storage tank. Means well known in the art, such as fractionation or chemical treatment, can be employed to effect this additional purification.

Referring now to Figure 2 of the drawing, there is illustrated a modification of the invention in which one of the catalyst components is employed in a fixed bed. Identical reference numerals are used to designate elements similar to those described in conjunction with Figure 1. After passage through a purification system similar to that described in Figure 1, the ethylene to be polymerized is introduced into absorber 111 through line 46. At the same time a diluent, such as cyclohexane, is withdrawn from diluent storage tank 112 through line 113 and introduced into the absorber wherein the purified ethylene is absorbed in the diluent. Any unabsorbed ethylene which is removed from the absorber through line 114 may be recycled to line 46 or returned for passage through the purification system. Line 116 connected to storage tank 112 provides means for adding make-up diluent to the system.

The ethylene-rich diluent stream removed from the absorber through line 117 is introduced into guard tank 118 wherein this stream is contacted with an organometal, such as triethylaluminum, or an active metal, such as sodium, for removal of the last traces of impurities which might adversely affect the catalyst system. The highly purified ethylene-rich diluent stream is then passed via line 119 to heat exchanger 121. In this heat exchanger, the stream is brought to about the desired polymerization temperature, e.g., a temperature in the range of 50° F. to 300° F. This ethylene-rich diluent stream is then introduced into reactor 122 by means of line 123. A rate of flow controller 124 operatively connected to an orifice in line 123 and to a flow control means, such as motor valve 126, provides means for controlling the rate at which this stream is charged to the reactor.

At the same time one of the components of the catalyst system, e.g., a mixture of organometal halides, such as ethylaluminum sesquichloride, is withdrawn from catalyst storage tank 127 through line 128 and then passed into line 123 at a point immediately preceding its entry into the reactor. Purified nitrogen from tank 129 is fed to storage tank 127 through line 131 so as to maintain a nitrogen atmosphere over the catalyst component stored in this tank and in order to pressure the catalyst component into the reactor. Rate of flow controller 132, operatively connected to an orifice in line 128 and to a flow control means, such as motor valve 133, provides means for controlling the rate at which the catalyst component is charged to the reactor.

Polymerization reactor 122 contains another of the components of the catalyst system, such as titanium dioxide, disposed within the reactor in a fixed bed. It is also within the scope of the invention to utilize as the fixed bed a carrier impregnated with one of the catalyst components. For example, a liquid catalyst component, such as titanium tetrachloride, can be used to impregnate a silica and/or alumina carrier. The catalyst-diluent-ethylene stream which is fed into the reactor through line 123 passes over the bed of titanium dioxide. When the two components of the catalyst system contact one another within the reactor, a catalyst complex is formed which causes the polymerization of the ethylene to a high molecular weight ethylene polymer. This high molecular weight polymer is soluble in the diluent being employed at the temperature at which the polymerization is being carried out. The conditions under which the polymerization is carried out are in general the same as those described hereinabove in conjunction with Figure 1 with the reaction temperature being such as to maintain the polymer in solution in the diluent. The effluent from reactor 122, containing diluent, dissolved ethylene polymer and a small amount of catalyst complex is withdrawn from the reactor through line 134. The rate at which the effluent is withdrawn from the reactor is controlled by means of pressure controller 136 which is operatively connected to the reactor and to a flow control means, such as motor valve 137, in line 134. The effluent is withdrawn from the reactor at a rate such as to maintain a predetermined pressure within the reactor. When the effluent stream passes through motor valve 137, a pressure drop is sustained, which results in the cooling of this stream, but such cooling is insufficient to precipitate the polymer.

The effluent stream from reactor 122 is introduced into filter 138 wherein the catalyst particles carried out of the polymerization reactor are separated out. The catalyst particles, which are removed from filter 138 through line 139, may then be passed to waste disposal. The polymer solution is withdrawn from the filter through line 141 and passed into mixer 142 equipped with a suitable stirrer 143. In the mixer, the polymer solution is thoroughly mixed with a catalyst deactivating agent, such as water or methyl alcohol, in order to deactivate any dissolved catalyst. The deactivating agent is charged to the mixer from storage tank 144 by means of line 146. The treated polymer solution is removed from the mixer through line 147 and passed into cooler 148 wherein the solution is cooled in order to precipitate the polymer. When the deactivating agent is one which is substantially immiscible with the polymer solution, e.g., when using water, it is preferred to separate the agent from the polymer solution prior to the precipitation of any polymer from the solution. The polymer suspension in the diluent-deactivator solution is then withdrawn from the cooler through line 149 and passed into filter 93. After separation of the polymer in filter 93 from the diluent-deactivator solution, the polymer is passed into treating zone 96 and thence into drier 98. In the treating zone and drier, the polymer is treated in the same manner as described in conjunction with Figure 1 so as to obtain a colorless, high molecular weight polymer.

The diluent-deactivator mixture, which is withdrawn from filter 93 through line 101, is passed into separator 102. In the separator, the diluent is separated from the the mixture and after further treatment as by drying in drier 106 it is returned to diluent storage tank 112. These operations are carried out in the same manner as was discussed in the description of Figure 1.

A more comprehensive understanding of the invention may be obtained by referring to the following illustrative examples, which are not intended, however, to be unduly limitative of the invention.

*Example I*

A system similar to that shown in Figure 1 of the drawing is utilized in a continuous process for the preparation of polyethylene. The ethylene feed stream introduced into the compressor at the rate of 585 pounds per hour has the following composition:

| Component: | Weight percent |
|---|---|
| $C_2H_4$ | 98.09 |
| $CH_4$ | 0.01 |
| $CH\equiv CH$ | 1.58 |
| $C_2H_6$ | 0.29 |
| $CO_2$ | 0.03 |
| $O_2$ and $CO$ | Trace |

After passage through the purification system, the ethylene feed stream is charged to a 500 gallon polymerization reactor at the rate of 565 pounds per hour. After purification this stream contains no more than 1 part per million of acetylene, 1000 parts per million of carbon dioxide, and 0.0 part per million of oxygen and carbon monoxide. A catalyst consisting of a mixture of ethylaluminum sequichloride (a mixture of ethylaluminum dichloride and diethylaluminum chloride) and chromyl chloride dissolved in cyclohexane is pressured into the reactor with nitrogen at the rate of 1.92 pounds per hour of the sesquichloride and 0.08 pound per hour of chromyl chloride or at the rate of 2.0 pounds per hour for the total catalyst mixture. The diluent cyclohexane is charged to the reactor at the rate of 2520 pounds per hour.

The reaction temperature is maintained at about 100° F. while the pressure in the reactor is about 300 p.s.i.g. The reaction pressure is maintained at about 300 p.s.i.g. by controlling the rate at which ethylene is introduced into the reactor. The reaction mixture is continuously stirred, and the reactor contents are cooled by suitable cooling means, as required, to maintain the reaction temperature at about 100° F.

The reactor effluent comprising a slurry of polyethylene in cyclohexane and containing unreacted ethylene is withdrawn from the reactor at the rate of 3071 pounds per hour. Of this amount 210 pounds are polyethylene, 2508 pounds are cyclohexane, 2 pounds are catalyst components, and 353 pounds are unreacted ethylene. After passing through a cooler to precipitate any polymer which may be dissolved in the cyclohexane, the effluent is introduced into a gas-liquid separator. Gaseous ethylene is taken overhead from this separator at the rate of 350 pounds per hour. A slurry of 209 pounds of polyethylene in 2504 pounds of cyclohexane is removed per hour from the bottom of the gas-liquid separator and passed into a catalyst deactivator vessel. In this vessel the slurry is intimately contacted with water which acts as a catalyst deactivator and which is charged to the vessel at the rate of 1700 pounds per hour. An effluent composed of 2500 pounds of cyclohexane, 1690 pounds of water, and 208 pounds of polyethylene is withdrawn per hour from the catalyst deactivator vessel and passed into a comminutor. In the comminutor the polyethylene is reduced to finely divided form after which the effluent therefrom is passed into a filter. The finely divided polyethylene is separated in the filter from the cyclohexane and water, these latter materials being removed from the filter at the rate of 2470 pounds of cyclohexane per hour and 1660 pounds of water per hour. The polyethylene is passed from the filter into a treating zone wherein the polymer is contacted with hydrochloric acid and then water washed to effect removal of any catalyst residues remaining after the above described catalyst inactivating treatment. After the acid treatment and washing with water, the polyethylene is passed into a drier wherein it is dried. The polyethylene which is withdrawn from the drier at the rate of 205 pounds per hour is a high molecular weight polymer which is substantially white in color and possesses other desirable physical characteristics.

Cyclohexane and water are recovered from the drier at the rate of 10 pounds per hour of cyclohexane and 10 pounds per hour of water, and after being condensed are combined with the effluent stream removed from the filter. This stream is then introduced into a separator from which cyclohexane is taken overhead at the rate of 2470 pounds per hour with an aqueous stream being removed from the bottom of the separator. The cyclohexane is then introduced into a drier wherein it is dried over sodium. Dried cyclohexane is removed from the drier at the rate of 2460 pounds per hour and passed into a diluent storage tank. Make-up cyclohexane is charged to this storage tank at the rate of 60 pounds per hour. Differences between the amounts of materials charged to and withdrawn from the several pieces of equipment as discussed above are primarily due to mechanical losses.

*Example II*

A system similar to that shown in Figure 2 of the drawing is utilized in a continuous process for the preparation of polyethylene. An ethylene feed stream which has been purified as described in Example I is passed into an absorber at the rate of 122 pounds per hour. At the same time cyclohexane is withdrawn from a diluent storage tank and passed into the absorber at the rate of 2410 pounds per hour. In the absorber the ethylene is absorbed in the cyclohexane and the ethylene-rich cyclohexane stream recovered therefrom is then passed into a guard vessel wherein the stream is contacted with sodium for removal of any traces of impurities. This highly purified stream is passed from the guard tank through a heat exchanger wherein the temperature of the stream is brought to about 212° F. After this heating step, the ethylene-rich cyclohexane stream is charged to the reactor at the rate of 120 pounds of ethylene per hour and 2400 pounds of cyclohexane per hour.

Ethylaluminum sesquichloride, one of the catalyst components, is removed from a catalyst storage tank under nitrogen pressure at the rate of 1.1 pounds per hour. The catalyst component is combined with the ethylene-rich cyclohexane stream just prior to the introduction of this latter stream into the reactor. The polymerization reactor contains the other of the catalyst components, titanium dioxide, disposed herein in a fixed bed. The ethylene-rich cyclohexane stream containing the sesquichloride passes over the bed of titanium dioxide, the two catalyst components forming a catalyst complex which causes the polymerization of the ethylene. The reaction temperature is maintained at about 212° F., the polymer formed being soluble in the cyclohexane at this temperature. The pressure in the reactor is maintained at about 300 p.s.i.g. by controlling the rate at which effluent is withdrawn from the reactor.

The reactor effluent stream comprising polyethylene and cyclohexane is removed from the reactor at the rate of 119 pounds of polyethylene and 2395 pounds of cyclohexane per hour. This stream is then passed through a filter to remove any catalyst particles carried out of the reactor, after which it is introduced into a mixing vessel. In this vessel, the reactor effluent stream is thoroughly mixed with water which acts as a catalyst deactivator and which is charged to the vessel at the rate of 1000 pounds per hour. A stream comprising polyethylene, cyclohexane, and water is removed from the mixer and passed into a cooler in order to precipitate the polyethylene. The polymer suspension in the cyclohexane-water solution is then withdrawn from the cooler and introduced into a filter. The polyethylene is separated in the filter from the cyclohexane and water, these latter materials being removed from the filter at the rate of 2380 pounds of cyclohexane and 990 pounds of water per hour. The polyethylene is passed from the filter into a treating zone wherein the polymer is contacted with hydrochloric acid and then water washed to remove any catalyst residues remaining after the above-described catalyst inactivating treatment. After the acid treatment and water washing, the polyethylene is passed into a drier wherein it undergoes drying. The polyethylene which is withdrawn from the drier at the rate of 117 pounds per hour is a high molecular weight, substantially white polymer suitable for commercial use.

Cyclohexane and water are recovered from the drier at the rate of 10 pounds per hour of cyclohexane and 5 pounds per hour of water, and after condensation these materials are combined with the effluent stream recovered from the filter. This stream is then introduced into a separator from which cyclohexane is taken overhead at the rate of 2385 pounds per hour with an aqueous stream being removed from the bottom of the separator. The cyclohexane is then introduced into a drier wherein it is dried over sodium. Dried cyclohexane is removed from the drier at the rate of 2380 pounds per hour and passed into a diluent storage tank. Make-up cyclohexane is charged to this storage tank at the rate of 30 pounds per hour. Differences between the amounts of materials charged to and withdrawn from the several pieces of equipment as discussed above are primarily due to mechanical losses.

While the process of this invention has been described with relation to two component catalyst systems, it is applicable as well to three component systems as described hereinbefore. When utilizing catalyst which consists of three components, the third component can be charged to the reactor separately, or in some cases it may be advantageous to mix two of the components before introduction into the reactor. When the catalyst utilized includes a free metal, the metal is generally in the form of a powder or fine shavings. If the metal is used in a three component system which includes, for example, an organic halide or aluminum chloride, it has been found to be desirable to mix the metal with the halide prior to charging to the reactor. When a free metal is used in a two component system, e.g., with a group IV–A metal halide, the metal can be introduced directly into the reactor or suspended in a suitable inert diluent prior to introduction.

The polymers produced in accordance with the continuous process of this invention have utility in applications where solid plastics are used. They can be used to impregnate paper and fabrics, and they can be molded to form articles of any desired shape, such as bottles and other containers for liquids. Furthermore, they can be formed into pipe by extrusion.

It will be apparent to those skilled in the art that variations and modifications of the invention can be made upon study of the foregoing disclosure. Such variations and modifications are believed to be clearly within the spirit and scope of the invention.

We claim:

1. A continuous process for producing a solid polymer of an aliphatic 1-olefin having up to and including 8 carbon atoms per molecule which comprises introducing said olefin into a reaction zone; maintaining a predetermined pressure within said reaction zone by controlling the rate of olefin introduction thereinto; mixing a first component of an olefin polymerization catalyst system with a hydrocarbon diluent, inert and liquid under conditions of the process, said component being selected from the group consisting of organometallic compounds, metal hydrides, and group I, II and III metals of the periodic table; passing the resulting mixture of catalyst component and diluent into said reaction zone; introducing a second component of said catalyst system into said reaction zone, said component being selected from the group consisting of compounds of groups IV, V, VI and VIII metals of the periodic table; maintaining the ratio of the amounts of said first and second catalyst components supplied to said reaction zone in a predetermined mole ratio range by controlling the rate of their introduction thereinto; withdrawing reaction products comprising a slurry of polymer in diluent from said reaction zone; cooling the withdrawn reaction products so as to precipitate any polymer dissolved in said diluent; contacting said slurry of polymer in diluent with a catalyst deactivating agent selected from the group consisting of water, an alcohol, and an admixture of water and an alcohol; passing the resulting treated slurry of polymer in diluent into a comminution zone; comminuting said polymer in said comminution zone in the presence of said deactivating agent; separating finely divided polymer from said diluent and catalyst deactivating agent; contacting said separated polymer with an acid; washing said polymer to remove acid therefrom; and drying said polymer.

2. The process in accordance with claim 1 wherein said olefin prior to introduction into said reaction zone is passed into an acetylene absorber wherein it is contacted with an acetylene absorbent; an acetylene-free olefin stream is recovered from said acetylene absorber and then contacted with a carbon dioxide adsorbent; the resulting acetylene-free, carbon dioxide-free olefin stream is treated in an oxygen scrubber to remove oxygen therefrom; the acetylene-free, carbon dioxide-free, and oxygen-free olefin stream is then washed with water to remove any traces of treating agents used; and the resulting purified olefin stream is then dried to remove any moisture.

3. The process in accordance with claim 2 wherein said acetylene absorbent is dimethylformamide; said carbon dioxide adsorbent is a solution of aqueous sodium hydroxide; and said olefin stream is contacted with an alkaline pyrogallol solution in said oxygen scrubber.

4. The process in accordance with claim 1 wherein said 1-olefin is ethylene; said first component is a titanium chloride; and said second component is a mixture of ethylaluminum dichloride and diethylaluminum chloride.

5. The process in accordance with claim 1 wherein said 1-olefin is ethylene; said first component is a titanium chloride; and said second component is triethylaluminum.

6. The process in accordance with claim 1 wherein said 1-olefin is ethylene; said first component is chromyl chloride; and said second component is a mixture of ethylaluminum dichloride and diethylaluminum chloride.

7. The process in accordance with claim 1 wherein said 1-olefin is ethylene; said first component is titanium butoxide; and said second component is a mixture of ethylaluminum dichloride and diethylaluminum chloride.

8. A process in accordance with claim 1 wherein the ratio of the amounts of said first and second components is in the following range: from 0.02 to 50 mols of said first component per mol of said second component.

9. A process in accordance with claim 1 wherein said deactivating agent is a mixture of water and alcohol.

References Cited in the file of this patent

UNITED STATES PATENTS

| | | |
|---|---|---|
| 2,728,758 | Field et al. | Dec. 27, 1955 |
| 2,741,332 | Finneran et al. | Apr. 10, 1956 |

FOREIGN PATENTS

| | | |
|---|---|---|
| 609,560 | Great Britain | Oct. 4, 1948 |
| 533,362 | Belgium | May 16, 1955 |

OTHER REFERENCES

"The Chemistry of Organic Compounds," Conant MacMillan Company 1933, New York, page 391.